(12) United States Patent
Looy et al.

(10) Patent No.: US 12,479,268 B2
(45) Date of Patent: Nov. 25, 2025

(54) MOTORIZED HVAC VENT SYSTEM

(71) Applicant: UUSI, LLC, Reed City, MI (US)

(72) Inventors: Bradley D. Looy, Big Rapids, MI (US); Richard L. Felicioni, Ada, MI (US); David W. Shank, Hersey, MI (US)

(73) Assignee: UUSI, LLC, Reed City, MI (US)

( * ) Notice: Subject to any disclaimer, the term of this patent is extended or adjusted under 35 U.S.C. 154(b) by 566 days.

(21) Appl. No.: 17/952,736

(22) Filed: Sep. 26, 2022

(65) Prior Publication Data

US 2023/0110134 A1  Apr. 13, 2023

Related U.S. Application Data

(60) Provisional application No. 63/254,003, filed on Oct. 8, 2021.

(51) Int. Cl.
*B60H 1/00* (2006.01)
(52) U.S. Cl.
CPC .............................. *B60H 1/00835* (2013.01)
(58) Field of Classification Search
CPC ............ B60H 1/00742; B60H 1/00835; B60H 1/00871
See application file for complete search history.

(56) References Cited

U.S. PATENT DOCUMENTS

| | | | |
|---|---|---|---|
| 10,723,198 B2 | 7/2020 | Freese et al. | |
| 11,091,009 B2 | 8/2021 | Skapof et al. | |
| 11,345,211 B2 | 5/2022 | Skapof | |
| 2015/0328958 A1* | 11/2015 | Winget, Jr. | B60H 1/00742 454/155 |
| 2019/0322154 A1* | 10/2019 | Ganguly | B60H 1/00742 |
| 2020/0047593 A1* | 2/2020 | Lee | B60H 1/3421 |
| 2022/0032731 A1 | 2/2022 | Skapof et al. | |

FOREIGN PATENT DOCUMENTS

WO  2020/102255 A2  5/2020

OTHER PUBLICATIONS

Holmes, Jake, Kia, MIT to show a car interior that adapts to your mood at CES, (Dec. 10, 2018), CNET: Cars. Retrieved Aug. 17, 2022, from CNET Web site: https://www.cnet.com/roadshow/new/kia-mit-mood-adaptive-concept-ces/.

* cited by examiner

*Primary Examiner* — Steven S Anderson, II
(74) *Attorney, Agent, or Firm* — Howard & Howard Attorneys PLLC

(57) ABSTRACT

A system and method for controlling motorized vents of an HVAC system of a vehicle including at least one motor to move air louvers of an HVAC vent of the HVAC system, at least one thermal sensor to sense hot/cold areas inside the vehicle, and a position and motion control to control movement of the at least one motor, wherein position and motion control determines a targeted positioning of airflow based on hot/cold areas sensed by the thermal sensor.

17 Claims, 3 Drawing Sheets

MOTORIZED HVAC VENT SYSTEM

CROSS-REFERENCE TO RELATED APPLICATION(S)

The present application claims the benefit of and priority to U.S. Provisional Patent Application Ser. No. 63/254,003, filed Oct. 8, 2021, the entire disclosure of which is hereby expressly incorporated by reference.

BACKGROUND OF THE INVENTION

1. Field of the Invention

The present invention relates generally to HVAC systems for vehicles and, more particularly to, systems and methods for controlling motorized vents in an HVAC system for a vehicle and communications methods for sending and receiving data.

2. Description of the Related Art

A vehicle, such as an automobile, truck, boat, and the like typically include one or more user interfaces accessible by occupants such as an operator and passengers for displaying information. A user interface may also include one or more inputs that an occupant uses, or the vehicle uses, to sense and control a vehicle function or accessory like an HVAC system, a radio, navigation system, or phone use. A user interface may also be used to control vehicle systems from portable accessories like a mobile phone or tablet.

In various types of vehicles, a user interface, such as a center stack console, is accessible to the operator and front seat passengers. The center stack has user interfaces for many vehicle functions and may include switches, knobs, light indicators, displays including touch sensitive displays, and the like. Other areas of a vehicle that may have user interfaces for sensing, control, and/or information display include overhead consoles where sunroof and interior lighting controls may be placed and rear seat controls for temperature control, entertainment systems, and the like. The particular type of user interface and its location may vary depending on the type of information displayed or accessory being controlled across a wide variety of applications. Accordingly, it is desirable to provide a control for a motorized HVAC vent system. It is also desirable to provide a system for controlling motorized vents in an HVAC system. Therefore, there is a need in the art to provide a motorized vent control system for an HVAC of a vehicle.

SUMMARY OF THE INVENTION

Accordingly, the present invention provides a system and method for controlling motorized vents in an HVAC system of a vehicle.

The present invention also provides a system for controlling motorized vents of an HVAC system of a vehicle including at least one motor to move air louvers of an HVAC vent of the HVAC system, at least one thermal sensor to sense hot/cold areas inside the vehicle, and a position and motion control to control movement of the at least one motor, wherein position and motion control determines a targeted positioning of airflow based on hot/cold areas sensed by the thermal sensor.

The present invention further provides a method for controlling motorized vents of an HVAC system of a vehicle including steps of moving at least one motor to move air louvers of an HVAC vent of the HVAC system, sensing, by at least one thermal sensor, hot/cold areas inside the vehicle, and controlling, by a position and motion control, movement of the at least one motor based on hot/cold areas sensed by the thermal sensor.

In one embodiment, the present invention provides a system including a user interface system that incorporates a mechanism to control various functions and aspects of an HVAC system such as setting a desired temperature setting, fan speed, vent selection like left, center, and/or right, and location like floor, dash, or defrost positions.

These and other objects, advantages, and features of the present invention will become better understood from the following detailed description of one exemplary embodiment of the present invention that is described in conjunction with the accompanying drawings.

DESCRIPTION OF THE PREFERRED EMBODIMENT(S)

One embodiment of the present invention employs a user interface to input a desired temperature setting, fan speed, vent selection and position, and location like floor, dash, or defrost positions. The user interface devices, according to the present invention, may be used to advantage in a wide variety of applications. In vehicle applications, for example, touch sensitive user interface devices facilitate interaction with the vehicle by a mechanism of a touch screen display, by various vehicle trim components with active touch areas, as well as knobs, switches and the like. The vehicle user may also send and receive commands and information to and from the vehicle via a mobile device such as a phone or tablet.

Figure 1:
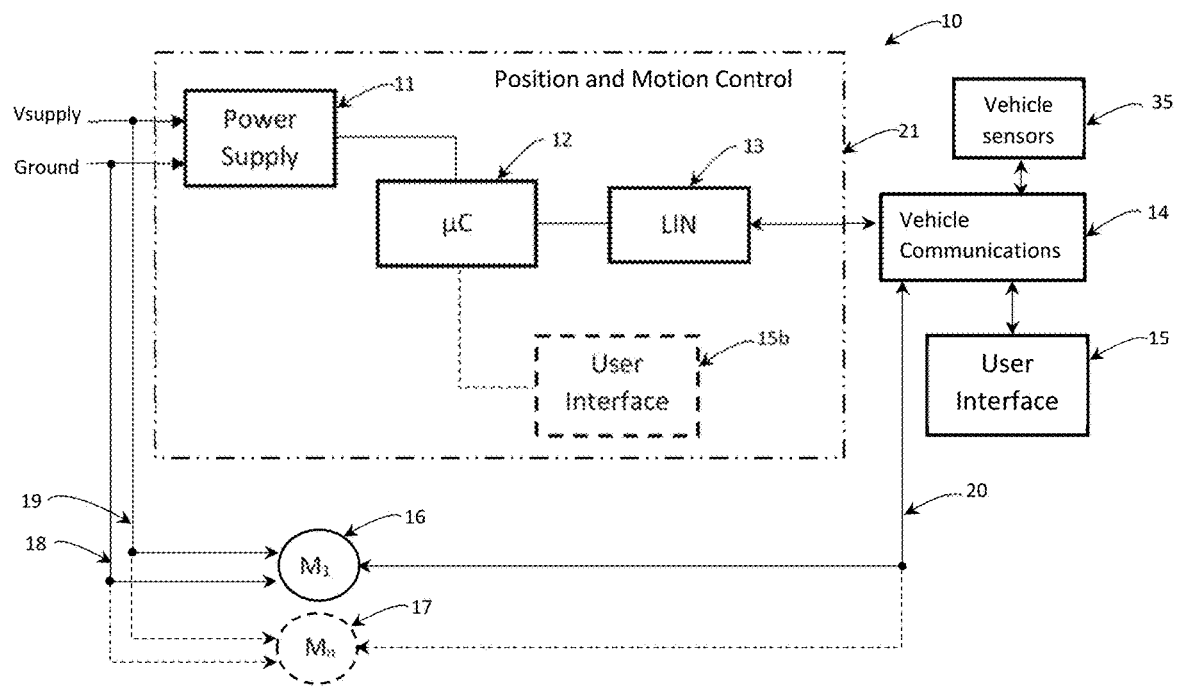
FIG. 1 is a diagrammatic view of a system, in accordance with one embodiment of the present invention, for controlling motorized vents in an HVAC system having a user interface and sensor inputs that may be used to control a vehicle accessory.

Referring to the drawings, and in particular FIG. 1, a block diagram illustrating one embodiment of a system 10, according to the present invention, is shown including a user interface 15 that provides a mechanism for a user to input data such as what radio station to listen to, what volume to play music, an HVAC temperature setpoint, a fan speed, and the like. The user interface 15 may be used to control one or more vehicle functions and vehicle accessories. The system 10 also includes a vehicle communications 14 communicating with the user interface 15 and one or more vehicle sensors 35 and provides a capability or mechanism to obtain data from at least one of the vehicle sensors 35 or transfer data another control. The system 10 includes functions that create a position and motion control 21. The position and motion control 21 includes a power supply 11, microcontroller (µC) 12, LIN communications 13, and an optional user interface 15b that may replace, or be additional to, the user interface 15. It should be appreciated that the position and motion control 21 is illustrated using LIN communications 13 protocol, but may use other protocols such as CAN, or other advantageous method.

In one embodiment, the system 10 also includes at least one motor 16 that controls the position of a louver or vane (not shown) of an HVAC vent. The at least one motor 16 has integral electronics that can interpret communications instructions from the vehicle communications 14. The at least one motor 16 is powered via Vsupply 19 and Ground 18 of the vehicle and is connected to the vehicle communication 14 via a connection mechanism 20. The at least one motor 16 receives instructions from the vehicle as to what position the at least one motor 16 should move or rotate to. For example, the microcontroller 12 of the position and motion control 21 receives input from the user interface 15 and, as a result, sends a command via the vehicle communications 14 to the at least one of motor 16 to rotate, for example, 25° in the clockwise direction. It should be appreciated that the at least one motor 16 interprets the communications instruction and rotates the proper amount and direction.

Figure 2:
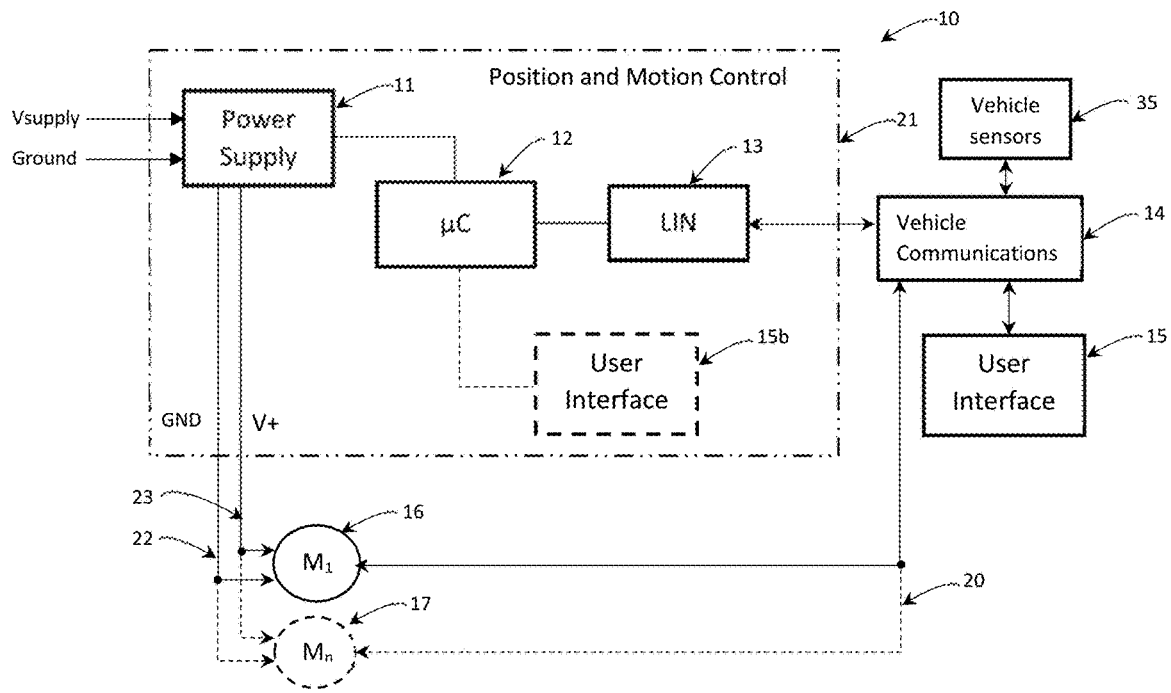
FIG. 2 is a diagrammatic view of a system, in accordance with one embodiment of the present invention, for controlling motorized vents in an HVAC system having a user interface and sensor inputs that may be used to control a vehicle accessory.

Referring to FIG. 2, in another embodiment of the system 10 of FIG. 1, power is supplied to the at least one motor 16 from the power supply 11 of the position and motion control 21 instead of direct connection to the vehicle power source. The power and ground are supplied via connections V+23 and GND 22. In some circumstances, it may be required to power the motors 16, 17 for the air louvers of the HVAC vent from the position and motion control 21 to provide a voltage that is not available or not regulated appropriately when connected directly to the vehicle. It should be appreciated that powering the motors 16, 17 directly from the position and motion control 21 also allows for drive electronics to be in the position and motion control 21 instead of integrated into each motor 16, 17.

Figure 3:
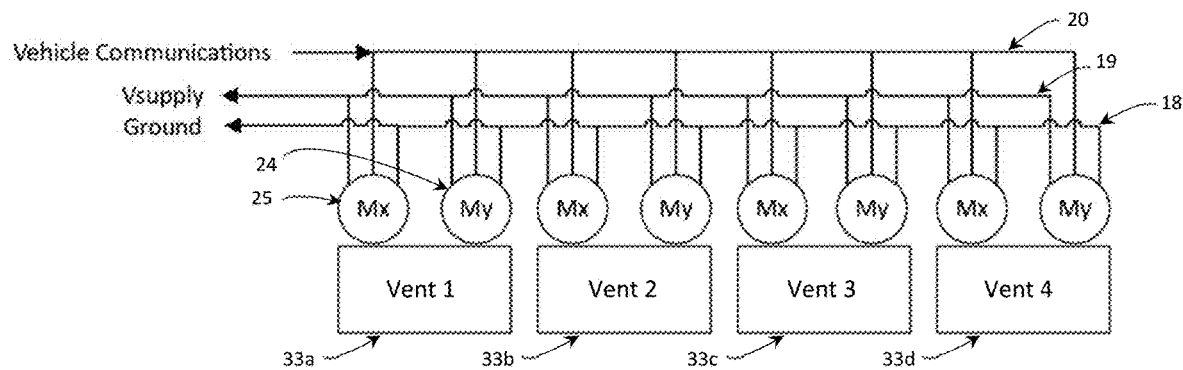
FIG. 3 is a diagrammatic view illustrating one configuration of the system for powering and controlling louver motors in a vehicle HVAC vent system in accordance with an embodiment of the present invention.

Referring now to FIG. 3, the system 10 may include a plurality of motors 16 to accomplish various tasks. For example, in one embodiment, the system 10 may include two (2) motors 16 attached to each HVAC vent in a dashboard of a vehicle. In one embodiment, a first motor 24 moves the air louvers or vanes in the y axis or up and down and a second motor 25 on each HVAC vent would move the air louvers or vanes in the x axis or left and right. With four (4) vents 33a-33d on a dashboard of a vehicle, for example, there would be eight (8) motors total. As illustrated, the first motor 24 shown as My moves the air louvers directing airflow up and down and the second motor Mx, shown as motor 25, moves air louvers that direct airflow left and right. In another embodiment shown in FIG. 4, the system 10 may include a third motor 26 that controls the amount of airflow from no airflow to full airflow by moving a damper in the HVAC vent.

Figure 5:
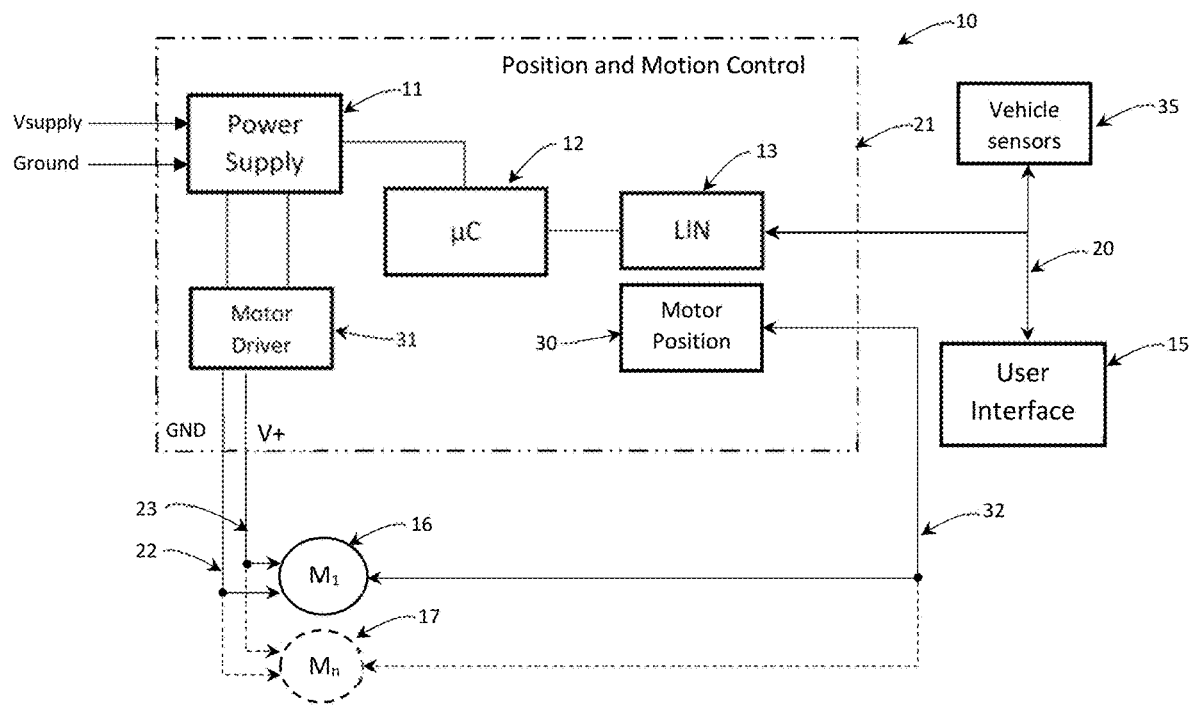
FIG. 5 a diagrammatic view illustrating a configuration for of the system for power and controlling louver and damper motors in a vehicle HVAC vent system in accordance with another embodiment of the present invention.

The system 10 of FIG. 5 is similar to the system 10 of FIG. 2 with the exception that the position and motion control 21 has a motor position 30 function as well as a motor driver 31 function. The motor position 30 takes the voltages 32 from each of the motors 16, 17 of FIG. 5 and interprets them to determine the position of each motor 16, 17. By knowing where each motor is, the position and motion control 21 can drive each motor to a desired location by employing the motor driver 31. It should be appreciated that the motor driver 31 provides proper voltages to energize each motor 16, 17 to drive it to a desired position.

Figure 4:
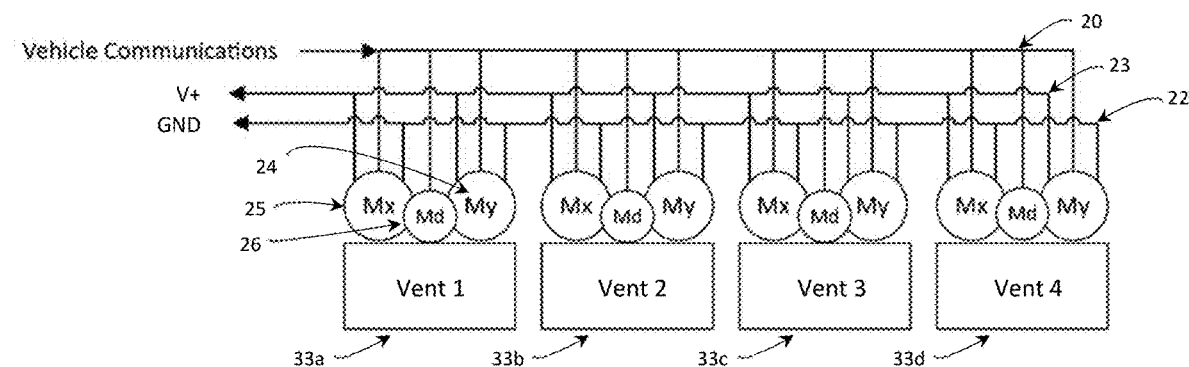
FIG. 4 is a diagrammatic view illustrating another configuration of the system for power and controlling louver and damper motors in a vehicle HVAC vent system in accordance with another embodiment of the present invention.
Figure 6:
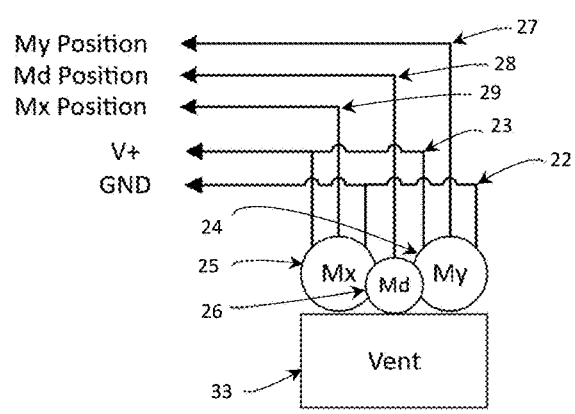
FIG. 6 is a diagrammatic view illustrating a configuration of an HVAC system having three (3) motors on an HVAC vent, each motor having an analog position signal.

In FIG. 6 with continual reference to FIGS. 4 and 5, another embodiment is shown which includes the motors 24, 25, and 26 that move the air louvers and a damper in the HVAC vent 33. Each of the motors 24, 25, and 26 includes an analog output voltage that represents its physical position. The motor 25 (Motor Mx) that positions the air louvers of the HVAC vent 33 in the x-axis or left and right, has an output 29 that provides a voltage that represents where in the full left to right range the louvers are currently positioned. For example, if the motor 25 is in the full left position, the output voltage on Mx position output 29 could be zero (0) volts. And if motor 25 is in the full right position, the output voltage on Mx position output 29 could be five (5) volts. So, if the position and motion control 21 energizes the motor 25 such that the air louvers are in the middle of its range, an output voltage of 2.5 volts would be present on Mx position output 29. It should be appreciated that the same holds true for the motor 24 (My) with output voltage 27 and the motor 26 (Md) with output voltage 28 whereas instead of left to right or up and down positioning, the motor 26 will travel from the damper full closed position to a damper fully open position.

Referring to FIG. 5, the system 10 includes the vehicle sensors 35 that send information to the position and motion control 21. The vehicle sensors 35 may include thermal sensors such as a thermal camera or discrete temperature sensors. By using thermal sensors, it is possible for the system 10 to determine hot/cold areas of the vehicle cabin. It should be appreciated, with this information, the HVAC vents 33 could be directed to provide airflow to specific areas by changing the louver position of the HVAC vent 33 and airflow with the goal being to homogenize the temperature throughout the vehicle cabin.

As previously discussed, the system 10 provides the mechanism to move air louvers and damper of the HVAC vent 33 to a desired position. The system 10 may include an oscillating function that will cyclically move the air louvers back and forth in a side to side and/or up and down motion to provide airflow across a predetermined path. This allows for air movement in the vehicle cabin to help homogenize the temperature as well as limiting the time spent in any one direction. For example, an operator may want air to blow on them, but not all the time, which would cause discomfort because the operator would get too cold or too warm. The vehicle cabin may still be too cold/warm, but the operator becomes uncomfortable because air is blowing on them all the time. It should be appreciated that providing oscillatory airflow will allow the vehicle cabin to come to a desired temperature, and maintain that desired temperature, while minimizing operator discomfort.

Further, the system 10 may include intelligence that could be employed by using the vehicle sensors 35 such as a thermal imaging device. The thermal image gathered from the thermal imaging device can be analyzed to determine where an occupant is located, and specifically where their face is located. If an operator's face location is known, the system 10 can cause the air louvers of the HVAC vent 33 to oscillate back and forth, and move up and down to avoid direct airflow to their face. Similarly, the air louvers of the HVAC vent 33 can oscillate back and forth to direct airflow, but the damper could be used to slow or stop the airflow to avoid or slow the blowing of air directly on the occupant. It should be appreciated that the system 10 may employ a standard camera instead of a thermal camera can be used to find an operator's face to avoid direct airflow to the operator's face.

In one embodiment, the vehicle sensors 35 may include occupancy sensors that provide information to the vehicle about whether a seat is occupied or not. This function has been typically used for turning on the airbag function or as a rear seat reminder that a child is present. However, occupancy sensing can also be employed by the system 10. If a seat, such as for a front passenger is empty, the two HVAC vents 33 typically associated with the passenger position could be closed by energizing the damper motor Md 26. It should be appreciated that closing off the HVAC vents 33 would provide more airflow for the remaining HVAC vents 33 that are open.

If each HVAC vent 33 has controllable louvers and dampers to control air direction and flow, the HVAC vents 33 can be adjusted to a user preferred location. For example, if vehicle operator #1 approaches the vehicle with a key fob, the vehicle recognizes the key fob as that of operator #1 and adjusts the air direction and flow to what the operator #1 had previously set the HVAC vents 33 to. It should be appreciated that, likewise, if vehicle operator #2 approaches the vehicle with their key fob, the vehicle will adjust HVAC parameters to what they previously had.

All vent position positioning may also be controlled remotely via a mobile device such as a phone or tablet. As vehicles become more and more automatic on the way to fully autonomous, a further benefit in the exemplary embodiment of the present invention is obtained by the use of a remote device. A vehicle operator may summon their car from the parking lot or their garage to come and pick them up at some location. The mobile device will send out the appropriate commands for the car to start moving toward the operator. The mobile device, having unique ID numbers like the IMEI number, identifies to the vehicle which operator is commanding it to move. It should be appreciated that, as such, the vehicle can adjust all HVAC parameters including vent position and flow, as well as seat position, mirror position, and other parameters that have been done for many years.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A system for controlling motorized vents of an HVAC system of a vehicle comprising:
   a plurality of motors to move air louvers of an HVAC vent of the HVAC system;
   wherein the plurality of motors comprises a first motor for positioning the louvers in an x direction and a second motor for positioning the louvers in a y direction;
   a third motor for positioning a damper of the HVAC vent;
   an occupant sensor to provide information about whether a seat is occupied by an occupant;
   at least one thermal sensor to sense hot/cold areas inside the vehicle; and
   a position and motion control system to control the first motor, the second motor, and the third motor;
   wherein position and motion control system determines a targeted positioning of airflow on inanimate objects based on hot/cold areas of a vehicle cabin sensed by the thermal sensor and on the seat being occupied sensed by the occupant sensor for airflow avoidance directly on the occupant when the airflow is flowing from the HVAC vent.

2. The system of claim 1 wherein the position and motion control system includes a motor drive.

3. The system of claim 2 wherein the motor drive is integral to the first motor, the second motor, and the third motor.

4. The system of claim 1 wherein the position and motion control system includes a power supply to supply power to the first motor, the second motor, and the third motor.

5. The system of claim 1 wherein the first motor, the second motor, and the third motor receives power directly from the vehicle.

6. The system of claim 1 wherein the first motor, second motor, and third motor are mounted on the structure of the HVAC vent.

7. The system of claim 1 wherein the at least one thermal sensor is a camera.

8. The system of claim 1 wherein the at least one thermal sensor is a temperature sensor.

9. The system of claim 1 wherein the position and motion control system oscillates the louvers for oscillation of airflow direction.

10. The system of claim 1 wherein the position and motion control system oscillates the louvers for oscillation of flow of air.

11. A method for controlling motorized vents of an HVAC system of a vehicle comprising steps of:
    moving air louvers of an HVAC vent of the HVAC system by a plurality of motors;
    positioning, by a first motor, the louvers in an x direction and a second motor for positioning the louvers in a y direction;
    positioning, by a third motor, a damper of the HVAC vent;
    detecting an occupant inside of the vehicle and minimizing airflow on the occupant;
    sensing, by at least one thermal sensor, hot/cold areas inside the vehicle; and
    controlling, by a position and motion control system, movement of the the air louvers and damper based on hot/cold areas sensed by the thermal sensor; and
    determining, by the position and motion control system, a targeted positioning of airflow on inanimate objects based on hot/cold areas of a vehicle cabin sensed by the thermal sensor and on the seat being occupied sensed by the occupant sensor for airflow avoidance directly on the occupant when the airflow is flowing from the HVAC vent.

12. The method of claim 11 including the step of controlling a damper for the HVAC vent by the position and motion control system.

13. The method of claim 11 including the step of supplying power, by a power supply of the position and motion control system, to the first motor, the second motor, and the third motor.

14. The method of claim 11 including the step of receiving, by the first motor, the second motor, and the third motor, power directly from the vehicle.

15. The method of claim 11 including the step of mounting the first motor, second motor, and third motor on structure of the HVAC vent.

16. The method of claim 11 including the step of oscillating, by the position and motion control system, the louvers for oscillation of airflow direction.

17. The method of claim 11 including oscillating, by the position and motion control system, the louvers, for oscillation of flow of air.

* * * * *